J. G. PEACE & J. S. WINGFIELD.
ROASTING-PAN.

No. 177,151. Patented May 9, 1876.

WITNESSES:
Francis McArdle
John Goethals

INVENTOR:
J. G. Peace
J. S. Wingfield
BY
ATTORNEYS.

UNITED STATES PATENT OFFICE.

JOHN G. PEACE AND JOHN S. WINGFIELD, OF SALEM, MISSOURI.

IMPROVEMENT IN ROASTING-PANS.

Specification forming part of Letters Patent No. 177,151, dated May 9, 1876; application filed March 25, 1876.

*To all whom it may concern:*

Be it known that we, JOHN G. PEACE and JOHN S. WINGFIELD, of Salem, Dent county, Missouri, have invented a new and Improved Roasting-Pan, of which the following is a specification:

Our invention consists of a drip-pan with a closed top, for inclosing the article to be roasted, and having a water-pan in the bottom, below a perforated support for the roast, the water-pan being so that it can be drawn out at any time for filling without disturbing the roast, the object being to maintain an atmosphere of steam surrounding the roast, to protect it from burning by too much heat, and, at the same time, allowing of the use of greater heat than can be employed without the steam protection.

Figure 1:
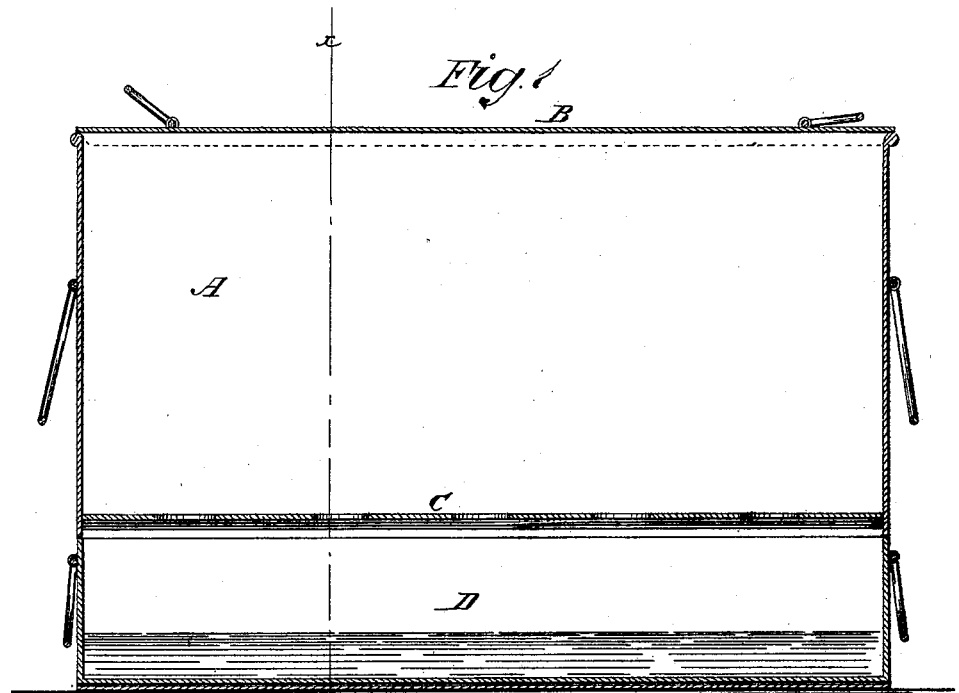
Figure 2:
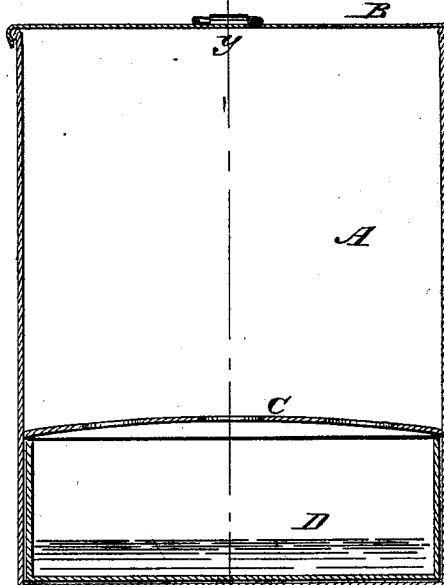

Figure 1 is a longitudinal sectional elevation of our improved roasting-pan, taken on the line $y\ y$, Fig. 2; and Fig. 2 is a transverse section taken on line $x\ x$, Fig. 1.

Similar letters of reference indicate corresponding parts.

A is the pan to contain the article to be roasted, the same being large and deep enough to wholly inclose the article, and having a closely-fitting cover, B, which will, by preference, be made to slide on and off. C is the perforated false bottom, on which the roast is to be supported, and D is the water-pan below the bottom C, for making steam to surround the roast. This pan slides in at one or both ends of pan A, to allow of replenishing the water without disturbing the roast.

By this contrivance the roast may be subjected to greater heat without burning than it will otherwise stand, and thus be cooked quicker.

In case a crust is desired, the water-pan may be removed a short time before the roast is done.

We are aware that a covered baking-pan with internal water-receptacle and a vessel surrounded by water are not new; but these are intended for use on top of a stove. Our invention is solely for roasting within the stove-oven, so as to retain the flavor.

What we claim is—

A roaster for insertion within a stove-oven, provided with a perforated false bottom, C, to receive the article to be cooked, and immediately thereunder a sliding pan to receive successive portions of water as the cooking progresses, all as shown and described.

JOHN G. PEACE.
      JOHN S. WINGFIELD.

Witnesses:
 J. M. ORCHARD,
 JOHN Q. THOMPSON.